(12) United States Patent
Monsheimer et al.

(10) Patent No.: US 7,906,063 B2
(45) Date of Patent: Mar. 15, 2011

(54) PROCESS FOR PRODUCING MOLDINGS

(75) Inventors: Sylvia Monsheimer, Haltern am See (DE); Franz-Erich Baumann, Dülmen (DE); Maik Grebe, Bochum (DE); Eva Von Der Bey, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 1090 days.

(21) Appl. No.: 10/590,935

(22) PCT Filed: Dec. 15, 2004

(86) PCT No.: PCT/EP2004/053505
§ 371 (c)(1),
(2), (4) Date: Dec. 20, 2006

(87) PCT Pub. No.: WO2005/082973
PCT Pub. Date: Sep. 9, 2005

(65) Prior Publication Data
US 2007/0197692 A1    Aug. 23, 2007

(30) Foreign Application Priority Data
Feb. 27, 2004 (DE) .......................... 10 2004 010 162

(51) Int. Cl.
*B27N 5/00* (2006.01)
*B29C 35/08* (2006.01)
*B29C 41/02* (2006.01)

(52) U.S. Cl. ........................................ 264/460; 264/497

(58) Field of Classification Search .................. 264/460, 264/497
See application file for complete search history.

(56) References Cited

U.S. PATENT DOCUMENTS

| | | | |
|---|---|---|---|
| 5,134,221 A | 7/1992 | Lavalette et al. | |
| 5,425,817 A | 6/1995 | Mugge et al. | |
| 6,884,485 B2 | 4/2005 | Baumann et al. | |
| 7,135,525 B2 | 11/2006 | Petter et al. | |
| 7,211,615 B2 | 5/2007 | Baumann et al. | |
| 2004/0102539 A1 | 5/2004 | Monsheimer et al. | |
| 2004/0106691 A1 | 6/2004 | Monsheimer et al. | |
| 2004/0137228 A1* | 7/2004 | Monsheimer et al. | 428/402 |
| 2004/0138363 A1 | 7/2004 | Baumann et al. | |
| 2004/0232583 A1 | 11/2004 | Monsheimer et al. | |
| 2005/0014842 A1 | 1/2005 | Baumann et al. | |
| 2005/0027047 A1 | 2/2005 | Monsheimer et al. | |
| 2005/0027050 A1 | 2/2005 | Monsheimer et al. | |
| 2005/0038201 A1 | 2/2005 | Wursche et al. | |
| 2006/0071359 A1 | 4/2006 | Monsheimer et al. | |
| 2006/0134419 A1 | 6/2006 | Monsheimer et al. | |
| 2006/0182916 A1 | 8/2006 | Dowe et al. | |
| 2006/0183869 A1 | 8/2006 | Dowe et al. | |
| 2006/0189784 A1 | 8/2006 | Monsheimer et al. | |
| 2006/0202395 A1 | 9/2006 | Monsheimer et al. | |
| 2006/0223928 A1 | 10/2006 | Monsheimer et al. | |
| 2006/0244169 A1 | 11/2006 | Monsheimer et al. | |
| 2006/0281873 A1 | 12/2006 | Alting et al. | |
| 2007/0055044 A1 | 3/2007 | Simon et al. | |
| 2007/0104971 A1 | 5/2007 | Wursche et al. | |
| 2007/0166560 A1 | 7/2007 | Wursche et al. | |
| 2007/0260014 A1 | 11/2007 | Simon et al. | |
| 2008/0119632 A1 | 5/2008 | Baumann et al. | |
| 2008/0166529 A1 | 7/2008 | Hager et al. | |
| 2008/0213552 A1 | 9/2008 | Hager et al. | |
| 2008/0217821 A1 | 9/2008 | Goring et al. | |
| 2008/0242782 A1 | 10/2008 | Hager et al. | |
| 2008/0249237 A1 | 10/2008 | Hager et al. | |
| 2009/0088508 A1 | 4/2009 | Monsheimer et al. | |

FOREIGN PATENT DOCUMENTS

| | | |
|---|---|---|
| DE | 44 33 118 | 3/1996 |
| EP | 0 428 760 | 5/1991 |
| WO | 01 38061 | 5/2001 |

OTHER PUBLICATIONS

U.S. Appl. No. 60/831,222, filed Jul. 17, 2006, Hager, et al.
U.S. Appl. No. 12/407,065, filed Mar. 19, 2009, Monsheimer, et al.
U.S. Appl. No. 12/131,425, filed Jun. 2, 2008, Monsheimer, et al.
U.S. Appl. No. 12/089,926, filed Jun. 4, 2008, Haeger, et al.
U.S. Appl. No. 11/816,556, filed Jan. 28, 2008, Wursche, et al.
U.S. Appl. No. 12/192,208, filed Aug. 15, 2008, Goering, et al.
U.S. Appl. No. 11/694,129, filed Mar. 30, 2007, Monsheimer, et al.
U.S. Appl. No. 11/671,820, filed Feb. 6, 2007, Monsheimer, et al.
U.S. Appl. No. 12/105,672, filed Apr. 18, 2008, Simon, et al.
U.S. Appl. No. 10/592,952, filed Sep. 15, 2006, Monsheimer, et al.
U.S. Appl. No. 11/484,593, filed Jul. 12, 2006, Monsheimer, et al.
U.S. Appl. No. 11/561,021, filed Nov. 17, 2006, Simon, et al.
U.S. Appl. No. 11/587,795, filed Oct. 27, 2006, Monsheimer, et al.
U.S. Appl. No. 11/587,758, filed Oct. 27, 2006, Baumann, et al.
U.S. Appl. No. 11/596,365, Nov. 14, 2006, Monsheimer, et al.

* cited by examiner

*Primary Examiner* — Leo B Tentoni
(74) *Attorney, Agent, or Firm* — Oblon, Spivak, McClelland, Maier & Neustadt, L.L.P.

(57) ABSTRACT

The present invention is directed to a process of producing moldings by a layer-by-layer process including selectively melting regions of a respective pulverulent layer via unfocused introduction of electromagnetic energy, using a polymer powder, wherein the powder includes at least one thermoplastic random copolymer with an ISO 1133 MFR value of from 12 to 1 gm/10 min.

21 Claims, No Drawings

PROCESS FOR PRODUCING MOLDINGS

The rapid production of prototypes is a task often required in very recent times. Particularly suitable processes are those whose operation is based on pulverulent materials and which produce the desired structures layer-by-layer via selective melting and hardening. Support structures for overhangs and undercuts can be omitted here, because the powder bed surrounding the molten regions provides adequate support. Nor is there any need for subsequent operations to remove supports. These processes are also suitable for short-run production.

The invention relates to a polymer powder based on thermoplastic random copolymers with an ISO 1133 MFR value of from 12 g/10 min to 1 g/10 min, preferably from 10 g/10 min to 1 g/10 min, preferably on copolyamides with a DIN 53727 relative solution viscosity in m-cresol of from 1.55 to 1.9, preferably from 1.6 to 1.7, or else on copolyesters, to the use of this powder in shaping processes, and also to moldings produced via a layer-by-layer process by which regions of a powder layer are selectively melted via introduction of electromagnetic energy, using this powder. Once the previously molten regions have been cooled and hardened, the molding can be removed from the powder bed.

The selectivity of these layer-by-layer processes can be achieved, by way of example and with no intention of restricting the invention thereto, by applying susceptors, absorbers, or inhibitors, or via masks. The selectivity does not arise by way of the introduction of the electromagnetic energy.

A number of processes are described below by which inventive moldings can be produced from the inventive powder, but there is no intention to restrict the invention thereto.

Processes with good suitability are the SIB process as described in WO 01/38061, or a process described in EP 1 015 214. Both processes operate with full-surface infrared heating to melt the powder. The selectivity of melting is achieved in the first by applying an inhibitor and in the second via a mask. DE 103 11 438 describes another process. In this, the energy needed to melt the powder particles is introduced via a microwave generator, and the selectivity is achieved via application of a susceptor.

For the rapid protyping or rapid manufacturing process (RP process or RM process) mentioned use may be made of pulverulent substrates, in particular polymers, preferably selected from polyester, polyvinyl chloride, polyacetal, polypropylene, polyethylene, polystyrene, polycarbonate, poly(N-methylmethacrylimides) (PMMI), polymethyl methacrylate (PMMA), ionomer, polyamide.

DE 44 33 118 considers polymer blends exposed to electromagnetic energy. However, a blend is a mixture prepared in the melt from two or more polymers under defined temperature conditions and shear conditions, and is usually processed to give pellets. Here, the individual polymer chains are mixed with one another ("intermolecularly"), but no recombination of the starting components takes place within a chain. (For an example of a definition see Sachtling Kunststofftaschenbuch [Plastics Handbook], 24th edition, pp 7 et seq.).

A processing disadvantage is that in order to avoid what is known as curl the temperature in the construction space or construction chamber has to be kept with maximum uniformity at a level just below the melting point of the polymeric material. In the case of amorphous polymers, this means a temperature just below the glass transition temperature, and in the case of semicrystalline polymers this means a temperature just below the crystallite melting point. Curl means distortion of the region after melting, the result being at least some protrusion out of the construction plane. There is a resultant risk that when the next powder layer is applied, for example via a doctor or a roller, the protruding regions may be shifted or even entirely broken away. The consequence of this for the process is that the overall construction space temperature has to be kept at a relatively high level, and that the volume change brought about via cooling and via crystallization of the moldings produced by these processes is considerable. Another important factor is that the period required for cooling is significant specifically for "rapid" processes.

Another disadvantage of the semicrystalline thermoplastics in many instances is their crystallinity, and the volume change caused thereby during cooling from the melt. Although it is possible to use very complicated and precise temperature control to achieve a substantial equalization of the volume change due to the crystallinity of an individual layer, the volume change due to crystallization in three-dimensional moldings of any desired structure is not uniform throughout the molding. By way of example, the formation of crystalline structures is dependent on the cooling rate of the molding, and at locations of different thickness or at angled locations this rate differs from that at other locations within the molding.

A disadvantage of amorphous thermoplastics is high viscosity, permitting coalescence only markedly above the melting point or the glass transition temperature.

Moldings produced by the above processes using amorphous thermoplastics are therefore often relatively porous; the process merely forms sinter necks, and the individual powder particles remain discernible within the molding. However, if the amount of energy introduced is increased in order to reduce viscosity there is the additional problem of precision of shape; by way of example, the contours of the molding lose sharpness as a result of heat conducted from the melting regions into the surrounding regions.

Another disadvantage is that a single material cannot always meet other diverse requirements, for example viscosity, thermal stability, shrinkage, strength, impact resistance, and processability. The use of powder mixtures for this purpose is well known, but has other associated disadvantages. By way of example, the constancy of the mixtures has to be ensured through preparation, processing, and, where appropriate, recycling. If the components have different melting points, the scope for adjusting the mixture simply as required by the desired properties of the molding is very restricted. In practice it has been found that the lower melting point then dominates during processing, the result being that the higher-melting component does not melt and merely acts as a filler, so that sometimes its desired properties are ineffective or only partially effective.

It was therefore an object of the present invention to provide a polymer powder which can be more versatile in achieving tailored properties in relation to processing, but also in relation to the desired properties of the molding. The process here is a powder-based layer-by-layer process in which regions of the respective layer are selectively melted via the unfocused introduction of electromagnetic energy, and after cooling bond to give the desired molding, the selectivity being achieved here, by way of example, by way of the application of susceptors or of absorbers or of inhibitors, or via masks.

Surprisingly, it has now been found, as described in the claims, that the use of thermoplastic random copolymers with an MFR value of from 12 to 1 g/10 min, preferably from 10 to 1 g/10 min, can produce polymer powders from which it is possible, via a layer-by-layer process in which regions of the respective layer are selectively melted via introduction of electromagnetic energy, to produce moldings which have advantages in relation to processability, or which combine different properties of moldings in one component.

The invention therefore provides a polymer powder for processing in a layer-by-layer process in which regions of the respective layer are selectively melted via introduction of electromagnetic energy, which comprises at least one thermoplastic random copolymer with an ISO 1133 MFR value of from 12 g/10 min to 1 g/10 min, preferably from 10 g/10 min to 1 g/10 min, preferably a copolyamide with a DIN 53727 relative solution viscosity in m-cresol of from 1.55 to 1.9, preferably from 1.6 to 1.7; particular preference is given to a copolyamide containing at least one of the units from the group of the lactams, the diamines/dicarboxylic salts, and/or the aminocarboxylic acids. The inventive powders very particularly preferably contain monomer units from the group composed of laurolactam, caprolactam, aminoundecanoic acid, and also containing approximately equimolar amounts of the dicarboxylic acids adipic acid, sorbic acid, azelaic acid, sebacic acid, dodecanedioic acid, brassylic acid, tetradecanedioic acid, pentadecanedioic acid, octadecanedioic acid, terephthalic acid, isophthalic acid, and of the diamines hexamethylenediamine, 2-methylpentamethylenediamine, 2,2,4-trimethylhexamethylenediamine, 2,4,4-trimethylhexamethylenediamine, isophoronediamine, piperazine, bis(4-aminocyclohexyl)methane, or of the nylon salts formed therefrom.

The present invention also provides moldings produced via a layer-by-layer process in which regions of the respective powder layer are selectively melted via unfocused introduction of electromagnetic energy, the selectivity being achieved, by way of example, by way of masks, or via the application of susceptors, of inhibitors, or of absorbers, where the moldings comprise at least one thermoplastic random copolymer with an MFR value of from 12 g/10 min to 1 g/10 min, preferably from 10 g/10 min to 1 g/10 min, preferably a copolyamide with a solution viscosity of from 1.55 to 1.9, preferably from 1.6 to 1.7. The inventive moldings particularly preferably comprise a copolyamide containing at least one of the units from the group of the lactams, the diamine/dicarboxylic acid salts, and/or the aminocarboxylic acids. The inventive moldings very particularly preferably comprise copolyamides having monomer units from the group composed of laurolactam, caprolactam, aminoundecanoic acid, and also containing approximately equimolar amounts of the dicarboxylic acids adipic acid, sorbic acid, azelaic acid, sebacic acid, dodecanedioic acid, brassylic acid, tetradecanedioic acid, pentadecanedioic acid, octadecanedioic acid, terephthalic acid, isophthalic acid, and of the diamines hexamethylenediamine, 2-methylpentamethylenediamine, 2,2,4-trimethylhexamethylenediamine, 2,4,4-trimethylhexamethylenediamine, isophoronediamine, piperazine, bis(4-aminocyclohexyl)methane, or of the nylon salts formed therefrom.

The inventive polymer powder has the advantage that, via a layer-by-layer process in which regions of the respective layer are selectively melted, it can produce moldings at temperatures markedly lower than for moldings composed of conventional polymer powders. The result is faster production of moldings by one of the processes described, and improved process reliability.

The moldings produced here from the inventive powder have good mechanical properties similar to those of moldings produced from conventional powder. Although they are mostly softer than moldings composed of the non-inventive PA12 polymer powder usually used during laser sintering, they often compensate for this with much higher tensile strain at break, permitting, for example, very efficient production of snap-action hooks. In order to achieve the mechanical properties, it is useful for the MFR value of the inventive powder to be from 12 g/10 min to 1 g/10 min, preferably from 10 g/10 min to 1 g/10 min. In the case of the preferred copolyamide, a solution viscosity of from 1.55 to 1.9, preferably from 1.6 to 1.7, gives the desired mechanical properties. If the MFR value of the inventive powder is higher than stated, or, respectively, the solution viscosity values are lower than stated, the mechanical properties of the moldings constructed by one of the inventive processes using the powder become markedly poorer.

Another advantage of the inventive powder is that it can be processed effectively using the inventive processes. If the solution viscosity values for the inventive powder are lower than stated or, respectively, the MFR value is higher than stated, the reproducibility of the construction process becomes markedly poorer. In particular, it is likely that powder particles will stick to the application device, such as a roller or a doctor, after melting of the intended regions of a sequence of a few layers. If the values for the solution viscosity of the inventive powder are higher than stated in the specific case of the copolyamide, the mechanical properties again become markedly poorer, because it is no longer certain that the individual polymer particles will coalesce on melting to form the molding.

Surprisingly, it was also found that the processing latitude, i.e. a temperature difference between the "non-occurrence" of curl and full-surface melting of the powder not intended for melting, is mostly greater than when using conventional powders. Another advantage is the low shrinkage of the moldings produced using inventive powders, in comparison with moldings composed of semicrystalline homopolyamides, both produced by a layer-by-layer shaping process where regions of the respective powder layer are selectively melted via introduction of electromagnetic energy. The inventive powder is particularly preferably used in processes which are not based on focusing of the energy introduced via a laser. The speed advantage of simultaneous energy introduction over all of the selected regions has the associated disadvantage that thermal conductivity becomes more important. At locations with poor heat dissipation, for example cutouts, it is quite likely that further particles will cake onto the material, thus causing deviation from the desired profile. The lower processing temperature of the inventive powders is found here to be an advantage because the amount of energy which has to be introduced is smaller. The temperature difference between the regions to be melted and their surroundings can therefore be kept smaller.

The inventive copolymer powder is described below, but there is no intention that the invention be restricted thereto.

A feature of the inventive copolymer powder for processing in a layer-by-layer process in which regions of the respective powder layer are selectively melted via unfocused introduction of electromagnetic energy is that the powder comprises at least one thermoplastic random copolymer with an MFR value of from 12 g/10 min to 1 g/10 min, preferably from 10 g/10 min to 1 g/10 min, prepared from at least two monomer units. The preparation process may in the simplest case be a free-radical, or an anionic, or a cationic copolymerization process, or may be a Ziegler-Natta copolymerization process. There is a large number of suitable monomer units, such as ethene and vinyl acetate, acrylonitrile and styrene, tetrafluorethene and propene, ethene and 1-butene, trioxane and ethylene oxide, styrene and butadiene, or else a combination of three monomer units composed of acrylonitrile, styrene, and butadiene, known as ABS. The monomer units may be aliphatic or aromatic, and the resultant copolymer may be linear or branched. The invention uses at least one unit which at least is present in different isomeric forms, or two units, or three (ternary systems) or more units. The copolymers are mostly amorphous.

Particular preference is given to copolyamides the crystallinity of which can be controlled by way of the composition of the monomer units. The preparation process uses diamine/dicarboxylic acid salts and/or aminocarboxylic acids or lactams. Examples of the monomer units used are aminoundecanic acid, or else approximately equimolar amounts of the dicarboxylic acids adipic acid, sorbic acid, azelaic acid, sebacic acid, dodecanedioic acid, brassylic acid, tetradecanedioic acid, pentadecanedioic acid, octadecanedioic acid, terephthalic acid, isophthalic acid, and of the diamines hexamethylenediamine, 2-methylpentamethylenediamine, 2,2,4-trimethylhexamethylenediamine, 2,4,4-trimethylhexamethylenediamine, isophoronediamine, piperazine, bis(4-aminocyclohexyl)methane, or of the nylon salts formed therefrom.

In particular, combinations composed of caprolactam, laurolactam and AH salt are known, as are also combinations composed of caprolactam, laurolactam and DH salts, or caprolactam and laurolactam. These copolyamides in particular feature a low melting point.

Besides aliphatic dicarboxylic acids, use is made of aromatic dicarboxylic acids, which generally contribute to higher glass transition temperatures. Furthermore, low-symmetry comonomers, in particular trimethylhexamethylendiamine (TMD, isomer mixture), isophoronediamine (IPD), bis-(4-aminocyclohexyl)methane (PACM, isomer mixture) reduce the crystallinity—the result in the extreme case being a completely amorphous copolyamide—giving higher dimensional accuracy and sometimes increased translucency of the molding. Suitable other comonomers and rules for their selection are known to the person skilled in the art and are described by way of example in J. G. Dolden, Polymer (1976, 17), pp. 875-892.

Particular preference is given to random thermoplastic copolyamides with a solution viscosity of from 1.55 to 1.9, preferably from 1.6 to 1.7, attained via thermal polycondensation of monomer mixtures composed of diamine/dicarboxylic acid salts and/or of aminocarboxylic acids or of lactams. The method is similar to that for the homopolyamides, but of course the respective physico-chemical properties have to be taken into account, for example water-solubility of the monomers, melting point and thermal stability of the polymers. It is sufficient here for one monomer to be present in the form an isomer mixture.

Alternating copolyamides are preferably produced via solution polycondensation under mild conditions. However, in the melt transamidation reactions convert them into random copolyamides.

Block copolymers composed of various polyamides are generally obtained in two stages, first producing a prepolymer and then mixing with the second component. The resultant structures of the block copolymers are not stable, however, and at higher temperatures revert to random distribution with regard to the arrangement of the monomer units.

Graft copolymers can be obtained via reaction of previously formed polymers with other monomers. The graft reaction is initiated ionically or by a free-radical route on the NH groups along the polymer chain. An example is the reaction of PA6 with ethylene oxide to give hydrophilic to water-soluble products.

The DIN 53727 solution viscosity of the inventive copolyamides in 0.5% strength m-cresol solution is from 1.55 to 1.9, preferably from 1.6 to 1.7. The preparation of copolyamides is described by way of example in DE 32 48 776, and is known to the person skilled in the art.

The MFR value is determined to ISO 1133. The conditions, namely load and temperature, are specified as appropriate as a function of the material in the standards for molding compositions, e.g. in ISO 2580-1 for ABS. The normal method is to test a semicrystalline copolyamide at a relatively low temperature, for example 160° C., and a completely amorphous copolyamide at a higher temperature, for example 230° C. A typical weight here is 2.16 kg, but this value, too, is to be specified in accordance with the appropriate standards for molding compositions, as a function of the material.

Other preferred copolymers are copolyesters. Examples of the monomer units are adipic acid, isophthalic acid, dimethyl terephthalate, 1,4-butandiol, 1,6-hexandiol, polyethylene glycol.

The pellets prepared and comprising thermoplastic random copolymer are then ground at low temperatures, for example at −30° C. under nitrogen in an impact mill or pinned-disk mill, to give pulverulent particles. The material should be subjected to at least one precautionary sieving to remove the very coarse particles. A subsequent fractionation is usually useful. Inventive powders have the grain size range from 1 to 150 microns, preferably from 1 to 120 microns. The distribution of the grains here remains relatively broad. Typical values for the D90/D10 range are from 1:2 to 1:15, preferably from 1:3 to 1:5. Mechanical post-treatment can also be useful, for example in a high-speed mixer, in order to round the sharp-edged particles produced during the grinding process, and thus improve capability for applying relatively thin layers.

The inventive polymer powder preferably comprises at least one thermoplastic random copolymer with an ISO 1133 MFR value of from 12 g/10 min to 1 g/10 min, preferably from 10 g/10 min to 1 g/10 min, and with an average particle size of from 10 to 250 µm, preferably from 45 to 150 µm and particularly preferably from 50 to 125 µm.

Inventive copolyamide powders or copolyester powders are marketed, for example with the tradename Vestamelt by Degussa.

Inventive copolymer powder may also comprise auxiliaries and/or filler and/or other organic or inorganic pigments. These auxiliaries may, by way of example, be flow aids, e.g. precipitated and/or flumed silicas. By way of example, precipitated silicas are supplied with the product name Aerosil by Degussa AG, with various specifications. Inventive copolymer powder preferably comprises less than 3% by weight, preferably from 0.001 to 2% by weight and very particularly preferably from 0.05 to 1% by weight, of these auxiliaries, based on the entirety of the polymers present. By way of example, the fillers may be glass particles, metal particles or ceramic particles, e.g. glass beads, steel shot or granulated metal or foreign pigments, e.g. transition metal oxides. By way of example, the pigments may be titanium dioxide particles based on rutile or anatase, or carbon black particles.

The median size of these filler particles is preferably smaller than or approximately equal to the size of the particles of the copolymers. The extent to which the median particle size $d_{50}$ of the fillers is less than the median particle size $d_{50}$ of the copolymers is preferably not more than 20%, preferably not more than 15%, and very particularly preferably no more than 5%. A particular limitation on the particle size is given by the permissible overall height or, respectively, layer thickness in the rapid prototyping/rapid manufacturing system.

Inventive copolymer preferably comprises less than 75% by weight, with preference from 0.001 to 70% by weight, with particular preference from 0.05 to 50% by weight, and with very particular preference from 0.5 to 25% by weight, of these fillers, based on the entirety of the copolymers present.

If the stated maximum limits for auxiliaries and/or fillers are exceeded the result, depending on the filler or auxiliary used, can be marked impairment of the mechanical properties of moldings produced by means of these copolymer powders.

It is also possible to mix conventional polymer powders with inventive copolymer powders. This method can produce polymer powders with another combination of mechanical properties and processing latitude. The process for preparing these mixtures may be found in DE 34 41 708, for example.

To improve melt flow during the production of the moldings, use may be made of a flow promoter, such as metal soaps, preferably the alkali metal or alkaline earth metal salts of the underlying alkanemonocarboxylic acids or dimer acids, may be added to the precipitated or low-temperature-ground powder. The metal soap particles may be incorporated into the copolymer particles, or else mixtures of fine-particle metal soap particles and copolymer particles may be used.

The amounts used of the metal soaps are from 0.01 to 30% by weight, preferably from 0.5 to 15% by weight, based on the entirety of the copolymers, preferably copolyamides, present in the powder. The metal soaps used preferably comprise the sodium or calcium salts of the underlying alkanemonocarboxylic acids or dimer acids. Examples of commercially available products are Licomont NaV 101 or Licomont CaV 102 from Clariant.

To improve the processability of the polymer powder or for its further modification, inorganic foreign pigments may be added to the powder, examples being transition metal oxides, stabilizers, e.g. phenols, in particular sterically hindered phenols, flow promoters and flow agents, e.g. fumed silicas, or else filler particles. The amount of these substances added to the polymer, based on the total weight of polymers in the copolymer powder, preferably complies with the concentration stated for fillers and/or auxiliaries for the inventive copolymer powders.

The present invention also provides processes for producing moldings via layer-by-layer processes in which regions are selectively melted via unfocused introduction of electromagnetic energy, using inventive polymer powders which comprise at least one thermoplastic random copolymer with an MFR value of from 12 g/10 min to 1 g/10 min, preferably from 10 g/10 min to 1 g/10 min, preferably a copolyamide with a solution viscosity of from 1.55 to 1.9, preferably from 1.6 to 1.7. The inventive powder particularly preferably comprises copolyamides containing at least one of the units from the group of the lactams, of the diamine/dicarboxylic acid salts and/or of the aminocarboxylic acids. The powders very particularly preferably used in these processes are those which comprise copolyamides which contain monomer units from the group composed of laurolactam, caprolactam, aminoundecanoic acid, and also containing approximately equimolar amounts of the dicarboxylic acids adipic acid, sorbic acid, azelaic acid, sebacic acid, dodecanedioic acid, brassylic acid, tetradecanedioic acid, pentadecanedioic acid, octadecanedioic acid, terephthalic acid, isophthalic acid, and of the diamines hexamethylenediamine, 2-methylpentamethylenediamine, 2,2,4-trimethylhexamethylenediamine, 2,4,4-trimethylhexamethylenediamine, isophoronediamine, piperazine, bis(4-aminocyclohexyl)methane, or of the nylon salts formed therefrom.

The energy is introduced in unfocused form via electromagnetic radiation, for example simultaneously over the entire layer, or via unfocused traverse over parts or all of the powder layer, and the selectivity is achieved, by way of example, via masks, or via application of inhibitors, of absorbers, or of susceptors. Once all of the layers have been cooled, the inventive molding can be removed. The unmelted powder can be reused in the next construction process, where appropriate in a blend with virgin powder. The polymer powder is processed at a construction chamber temperature of from 80 to 160° C., preferably from 85 to 120° C.

The following examples of these processes serve for illustration, but with no intention that the invention be restricted thereto.

Processes with good suitability are the SIB process as described in WO 01/38061, or the process described in EP 1 015 214. Both processes operate with full-surface infrared heating to melt the powder. In the first, the selectivity of the melting process is achieved via the application of an inhibitor, and in the second process it is achieved via a mask. DE 103 11 438 describes another process. In this, the energy needed for the fusion process is introduced via a microwave generator, and the selectivity is achieved via application of a susceptor.

A feature of the inventive moldings produced via a layer-by-layer process in which regions are selectively melted via unfocused introduction of electromagnetic energy is that they comprise at least one random thermoplastic copolymer with an ISO 1133 MFR value of from 12 g/10 min to 1 g/10 min, preferably from 10 g/10 min, to 1 g/10 min. The inventive moldings preferably comprise at least one copolyamide with a DIN 53727 solution viscosity in m-cresol of from 1.55 to 1.9, preferably from 1.6 to 1.7. Inventive moldings very particularly preferably comprise at least one copolyamide containing at least one of the units from the group of the lactams, of the diamine/dicarboxylic acid salts and/or of the aminocarboxylic acid. The inventive moldings very particularly preferably comprise at least one copolyamide composed of monomer units from the group composed of laurolactam, caprolactam, aminoundecanoic acid, and also containing approximately equimolar amounts of the dicarboxylic acids adipic acid, sorbic acid, azelaic acid, sebacic acid, dodecanedioic acid, brassylic acid, tetradecanedioic acid, pentadecanedioic acid, octadecanedioic acid, terephthalic acid, isophthalic acid, and of the diamines hexamethylenediamine, 2-methylpentamethylenediamine, 2,2,4-trimethylhexamethylenediamine, 2,4,4-trimethylhexamethylenediamine, isophoronediamine, piperazine, bis(4-aminocyclohexyl)methane, or of the nylon salts formed therefrom.

The moldings may also comprise fillers and/or auxiliaries, e.g. heat stabilizers, e.g. sterically hindered phenol derivatives. Examples of fillers are glass particles, ceramic particles and also metal particles, e.g. iron spheres, or corresponding hollow spheres. The inventive moldings preferably comprise glass particles, very particularly preferably glass beads. Inventive moldings preferably comprise less than 3% by weight, preferably from 0.001 to 2% by weight, and very particularly preferably from 0.05 to 1% by weight, of these auxiliaries, based on the entirety of the polymers present. Inventive moldings also preferably comprise less than 75% by weight, preferably from 0.001 to 70% by weight, particularly preferably from 0.05 to 50% by weight, and very particularly preferably from 0.5 to 25% by weight, of these fillers, based on the entirety of the polymers present.

The examples below are intended to describe the inventive polymer powder which comprises at least one thermoplastic random copolymer with an ISO 1133 MFR value of from 12 g/10 min to 1 g/min, preferably from 10 g/10 min to 1 g/10 min, preferably copolyamide powder with a DIN 53727 solution viscosity of from 1.55 to 1.9, preferably from 1.6 to 1.7, and to describe their use, without restricting the invention to the examples.

The laser scattering values measured were obtained using the Malvern Mastersizer S, version 2.18.

EXAMPLE 1

Reprecipitation of Nylon-12 (PA 12), Non-Inventive 400 kg of unregulated PA 12 prepared by hydrolytic polymerization and having a relative solution viscosity of 1.62 and an end group content of 75 mmol/kg of COOH and 69 mmol/kg of $NH_2$ are heated to 145° C. with 2500 l of ethanol denatured with 2-butanone and 1% water content within a period of 5 hours in a 3 m³ stirred tank (d=160 cm), and kept at this temperature for 1 hour with stirring (blade stirrer, d=80 cm, rotation rate=49 rpm). The jacket temperature is then reduced to 124° C., and the internal temperature is brought to 125° C. using a cooling rate of 25 K/h with the same stirrer rotation rate, while ethanol is continuously removed by distillation. From now on, using the same cooling rate, the jacket temperature is kept below the internal temperature by from 2 K to 3 K. The internal temperature is brought to 117° C., at the same cooling rate, and then kept constant for 60 minutes. The internal temperature is then brought to 111° C., at a cooling rate of 40 K/h with further removal of material by distillation. At this temperature precipitation begins, detectable via heat generation. The distillation rate is increased to an extent that keeps the internal temperature at not above 111.3° C. After 25 minutes, the internal temperature falls, indicating the end of the precipitation process. The temperature of the suspension is brought to 45° C. via further removal of material by distillation and cooling by way of the jacket, and then the suspension is transferred to a paddle dryer. The ethanol is distilled off from the mixture at 70° C./400 mbar, and the residue is then further dried for 3 hours at 20 mbar/86° C. This gives a precipitated PA 12 with a median grain diameter of 55 μm. The bulk density was 435 g/l.

EXAMPLE 2

A powder composed of a random copolyamide composed of 40 parts of laurolactam, 30 parts of caprolactam, and 30 parts of equimolar mixture composed of dodecandioc acid and hexamethylenediamine, obtained via hydrolytic polycondensation, was produced via low-temperature grinding followed by fractionation. The powder thus obtained was treated with 0.1 part of Aerosil 200 in a Henschel mixer. The solution viscosity is 1.7. The MFR value was determined as 4 g/10 min at 160° C./2.16 kg. The bulk density is 491 g/l. The distribution of grains was determined as follows: $d_{10}$=17 μm, $d_{50}$=62 μm, $d_{90}$=112 μm.

EXAMPLE 3

A powder composed of a random copolyamide composed of 33 parts of laurolactam, 33 parts of caprolactam, and 33 parts of equimolar mixture composed of adipic acid and hexamethylenediamine, obtained via hydrolytic polycondensation, was produced via low-temperature grinding followed by fractionation. The powder thus obtained was treated with 0.1 part of Aerosil 200 in a Henschel mixer. The solution viscosity is 1.7. The MFR value was determined as 6 g/10 min at 160° C./2.16 kg. The bulk density is 475 g/l. The distribution of grains was determined as follows: $d_{10}$=11 μm, $d_{50}$=65 μm, $d_{90}$=105 μm.

EXAMPLE 4

A powder composed of a random copolyamide composed of 50 parts of laurolactam, 20 parts of caprolactam, and 30 parts of equimolar mixture composed of dodecandioc acid and hexamethylenediamine, obtained via hydrolytic polycondensation, was produced via low-temperature grinding followed by fractionation. The powder thus obtained was treated with 0.1 part of Aerosil R812 in a Henschel mixer. The solution viscosity is 1.55. The MFR value was determined as 12 g/10 min at 160° C./2.16 kg. The bulk density is 458 g/l. The distribution of grains was determined as follows: $d_{10}$=13 μm, $d_{50}$=66 μm, $d_{90}$=111 μm.

EXAMPLE 5

A powder composed of a random copolyamide composed of 60 parts of laurolactam, 25 parts of caprolactam, and 15 parts of equimolar mixture composed of adipic acid and hexamethylenediamine, obtained via hydrolytic polycondensation, was produced via low-temperature grinding followed by fractionation. The powder thus obtained was treated with 0.1 part of Aerosil 200 in a Henschel mixer. The solution viscosity is 1.6. The MFR value was determined as 9 g/10 min at 160° C./2.16 kg. The bulk density is 462 g/l. The distribution of grains was determined as follows: $d_{10}$=18 μm, $d_{50}$=75 μm, $d_{90}$=112 μm.

EXAMPLE 6

A powder composed of a random copolyamide composed of 15 parts of laurolactam and 85 parts of an equimolar mixture composed of dodecanedioic acid and isophoronediamine, obtained via hydrolytic polycondensation, was produced via low-temperature grinding followed by fractionation. The powder thus obtained was treated with 0.05 part of Aerosil 200 in a Henschel mixer. The solution viscosity is 1.7. The MFR value was determined as 5 g/10 min at 230° C./2.16 kg. The bulk density is 458 g/l. The distribution of grains was determined as follows: $d_{10}$=12 μm, $d_{50}$=56 μm, $d_{90}$=105 μm.

EXAMPLE 7

A powder composed of a random copolyester composed of 100 parts of butanediol, 45 parts of terephthalic acid and 55 parts of isophthalic acid, obtained via hydrolytic polycondensation, was produced via low-temperature grinding followed by fractionation. The powder thus obtained was treated with 0.2 part of Aerosil 200 in a Henschel mixer. The MFR value was determined as 12 g/10 min at 160° C./2.16 kg. The bulk density is 459 g/l. The distribution of grains was determined as follows: $d_{10}$=10 μm, $d_{50}$=61 μm, $d_{90}$=119 μm.

EXAMPLE 8

A powder composed of a random copolyester composed of 100 parts of butanediol, 11 parts of polyethylene glycol, 42 parts of terephthalic acid and 58 parts of isophthalic acid, obtained via hydrolytic polycondensation, was produced via low-temperature grinding followed by fractionation. The powder thus obtained was treated with 0.1 part of Aerosil 200 in a Henschel mixer. The bulk density is 471 g/l. The MFR value was determined as 10 g/10 min at 160° C./2.16 kg. The distribution of grains was determined as follows: $d_{10}$=17 μm, $d_{50}$=63 μm, $d_{90}$=122 μm.

A concrete mixer is used to prepare the mixture of powder from examples 1 and 5, and also the mixture of powder from example 6 with glass beads. The glass beads used comprised Spheriglass A glass with a coating from Potters with a diameter of 35 μm.

Further Processing and Test

An open-topped box measuring 10×10 cm was provided with a base which can be moved by way of a spindle. A heating tape was wound around the box and was set to 90° C. during the experiments. The base was moved to a position half a centimeter from the upper edge; the remaining space was filled with powder, which was smoothed using a metal plate. A metal frame of thickness 1 mm was then placed on the edge of the box, and above this was placed a metal plate with a relatively small round aperture, its distance from the powder layer being 1 mm. The powder layer within the circular aperture was melted using a radiant heater with power rating 1000 W from AKO, which was moved downward toward the experimental arrangement until the separation was 2 cm, for two seconds. The next steps, turning of the spindle to lower the base by 0.2 mm, and application of the next powder layer, and then again lowering the radiant heater to melt the powder, were repeated a number of times. The intention was to attain a disk after cooling of the experimental arrangement.

TABLE 1

Results of the experiments of the examples

| Example | Melting point (DSC) ° C. | Comment |
|---|---|---|
| Example 1 (non-inventive) | 187 | Markedly more energy introduction required than in the other examples |
| Example 2 | 112 | Good edge sharpness, almost no curl |
| Example 3 | 115 | Good edge sharpness, almost no curl |
| Example 4 | 113 | Good edge sharpness, almost no curl, slight adhesion tendency after a plurality of layers |
| Example 5 | 123 | Good edge sharpness, almost no curl |
| 75% of powder from example 5 and 25% of powder from example 1 | n.d. | Good edge sharpness, no curl |
| Example 6 | 120 | Good edge sharpness, almost no curl |
| Example 7 | 114 | Good edge sharpness, almost no curl |
| Example 8 | 110 | Good edge sharpness, almost no curl, slight adhesion tendency after a plurality of layers |
| 80% of powder from example 6 and 20% of glass beads | n.d. | Good edge sharpness, no curl |

The examples very clearly show that inventive polymer powders can be processed very effectively in an inventive process.

Disks, with some relatively sharp edges, could be obtained in all of the examples using inventive powder. In contrast, the non-inventive powder of example 1 exhibited curl which was too marked to permit sintering of more than one layer. The non-inventive powder of example 1 also had to be exposed to the radiant heater for at least 5 seconds in order for any melting at all to occur. The single layer exhibited marked cakeing beyond the desired profile. Shortening the exposure time while at the same time reducing the distance from the radiant heater improved the profile sharpness, and a plaque could likewise be produced but the quality of the component remained below that of the inventive examples.

The powders of examples 4 and 8 exhibited slight adhesion tendency on smoothing of the newly applied powder, as the duration of the experiment increased. However, they are also at the lower limit for solution viscosity and, respectively, the upper limit for MFR value. The mixtures of 75% of powder of example 5 with 25% of powder of example 1, and also 80% of powder of example 6 with 20% of glass beads had very advantageous behavior with respect to tendency to curl.

What is claimed is:

1. A process for producing moldings by a layer-by layer process, comprising selectively melting regions of a respective pulverulent layer via unfocused introduction of electromagnetic energy, using a polymer powder, wherein the powder comprises at least one thermoplastic random copolymer with an ISO 1133 MFR value of from 12 to 1 g/10 min.

2. The process as claimed in claim 1, wherein the powder comprises at least one thermoplastic random copolymer with an ISO 1133 MFR value of from 10 to 1 g/10 min.

3. The process as claimed in claim 1, wherein the powder comprises at least one thermoplastic random copolymer with an ISO 1133 MFR value of from 12 to 1 g/10 min, the selectivity being achieved via application of susceptors or of absorbers, or via masks.

4. The process as claimed in claim 1, wherein the powder comprises at least one thermoplastic random copolymer with an ISO 1133 MFR value of from 10 to 1 g/10 min, the selectivity being achieved via application of susceptors or of absorbers, or via masks.

5. The process as claimed in claim 1, wherein the powder comprises at least one thermoplastic random copolymer with an ISO 1133 MFR value of from 12 to 1 g/10 min, the selectivity being achieved via application of inhibitors.

6. The process as claimed in claim 1, wherein the powder comprises at least one copolyester.

7. The process as claimed in claim 6, wherein the powder comprises at least one copolyester containing at least one of the monomer units from the group of adipic acid, isophthalic acid, dimethyl phthalate, 1,4-butanediol, 1,6-hexanediol, and polyethylene glycol.

8. The process as claimed in claim 1, wherein the powder comprises at least one copolyamide.

9. The process as claimed in claim 8, wherein the powder comprises at least one copolyamide containing at least one of the units selected from the group of the lactams, the diamine/dicarboxylic acid salts, and/or the aminocarboxylic acids.

10. The process as claimed in claim 8, wherein the powder comprises at least one copolyamide containing at least one of the units selected from the group of laurolactam, caprolactam, aminoundecanoic acid, and also containing approximately equimolar amounts of the dicarboxylic acids adipic acid, sorbic acid, azelaic acid, sebacic acid, dodecanedioic acid, brassylic acid, tetradecanedioic acid, pentadecanedioic acid, octadecanedioic acid; terephthalic acid, isophthalic acid, and of the diamines hexamethylenediamine, 2-methyl-pentamethylenediamine, 2,2,4-trimethylhexamethylenediamine, 2,4,4-tri-methylhexamethylenediamine, isophoronediamine, piperazine, bis(4-aminocyclohexyl)methane, or of the nylon salts formed therefrom.

11. The process as claimed in claim 8, wherein the powder comprises at least one copolyamide containing caprolactam, laurolactam, and AH salt.

12. The process as claimed in claim 8, wherein the powder comprises at least one copolyamide containing caprolactam, laurolactam, and DH salt.

13. The process as claimed in claim 8, wherein the powder comprises at least one copolyamide containing caprolactam and laurolactam.

14. The process as claimed in claim 8, wherein the powder comprises at least one copolyamide, the DIN 53727 relative solution viscosity in m-cresol being from 1.55 to 1.9.

15. The process as claimed in claim 8, wherein the powder comprises at least one copolyamide, the DIN 53727 relative solution viscosity in m-cresol being from 1.6 to 1.7.

16. The process as claimed in claim 1, further comprising auxiliaries and/or filler and/or pigments.

17. The process as claimed in claim 16, comprising flow aids as auxiliary.

18. The process as claimed in claim 16, comprising glass particles as filler.

19. The process as claimed in claim 16, comprising metal soaps as auxiliary.

20. A process as claimed in claim 1, further comprising processing the polymer powder at a construction chamber temperature of from 80 to 160° C.

21. A process as claimed in claim 1, further comprising processing the polymer powder at a construction chamber temperature of from 85 to 120° C.

* * * * *